AUTOMATIC INTERROGATION SYSTEM FOR UTILITY METERS AND THE LIKE

Filed July 19, 1965 2 Sheets-Sheet 1

INVENTOR.
VERON E. LONG
BY
Fulwider, Patton, Rieber, Lee, and Utecht
ATTORNEYS

Dec. 3, 1968 V. E. LONG 3,414,676

AUTOMATIC INTERROGATION SYSTEM FOR UTILITY METERS AND THE LIKE

Filed July 19, 1965 2 Sheets-Sheet 2

INVENTOR.
VERON E. LONG
BY Fulwider, Patton, Rieber, Lee, and Utecht
ATTORNEYS

United States Patent Office 3,414,676

Patented Dec. 3, 1968

3,414,676
AUTOMATIC INTERROGATION SYSTEM FOR UTILITY METERS AND THE LIKE

Veron E. Long, 14315 Chandler Blvd., Van Nuys, Calif. 91401

Filed July 19, 1965, Ser. No. 472,917
18 Claims. (Cl. 179—2)

ABSTRACT OF THE DISCLOSURE

An automatic meter reading system, operable through telephone lines, including equipment for automatically measuring and recording a resistance corresponding to a respective meter dial position. The system includes equipment for sequentially dialing a plurality of subscribers' telephone numbers, activating the reading equipment if the respective telephone line is not in use, measuring the impedance of the telephone line alone, sequentially measuring the combined impedance of the telephone line and a plurality of resistance elements corresponding to meter dial positions, subtracting the telephone line impedance from each of the combined impedances and recording each of the differences.

This invention relates to means for determining the positions of movable elements, such as the dials of utility meters and the like, from a remote location, and more particularly to an improved automatic meter reading system capable of operation over existing telephone lines.

It is known to utilize existing telephone lines for meter reading purposes. However, the approaches heretofore taken are characterized by the use of complex equipment at the residences of the subscribers, including electronic signal generating networks, and often the replacement of existing meters with meters of specialized construction. The costs of installation, operation and upkeep of such apparatus are economically prohibitive.

It is an object of my invention to provide a unique meter reading system for automatically recording and storing information on the dial positions of existing meters.

It is another object of my invention to provide an automatic meter reading system in which active signal generating networks at the meter locations are eliminated.

A further object of my invention is to provide a meter reading system operable from a remote control station for automatically interrogating meters through telephone lines, and deriving data on dial positions through simple resistance measurements.

A still further object of my invention is to provide a unique automatic meter reading system which comprises a minimum number of component parts of simple design and reliable operation, capable of interrogating and storing information of meter readings throughout a telephone district in a minimum of time and at minimum expense.

The above and other objects and advantages of my invention will become apparent from the following description taken in conjunction with the accompanying drawings of an illustrative embodiment thereof, in which:

FIGURE 1 is a combined schematic and block diagram of a meter reading system of my invention, showing film-type resistance elements on the faces of the dials of a meter, such resistance elements at one end being connected to a common point, the pointers for the dials carrying wiper means electrically connected to respective fixed contacts of a stepping switch, showing a tape recorder in which are stored the telephone numbers of subscribers throughout a district, and showing control means for operation through conventional telephone office switching equipment for selecting individual telephone lines, making measurements corresponding to the positions of the dial pointers of the meter, and storing such measurements in the tape recorder;

Figure 1:
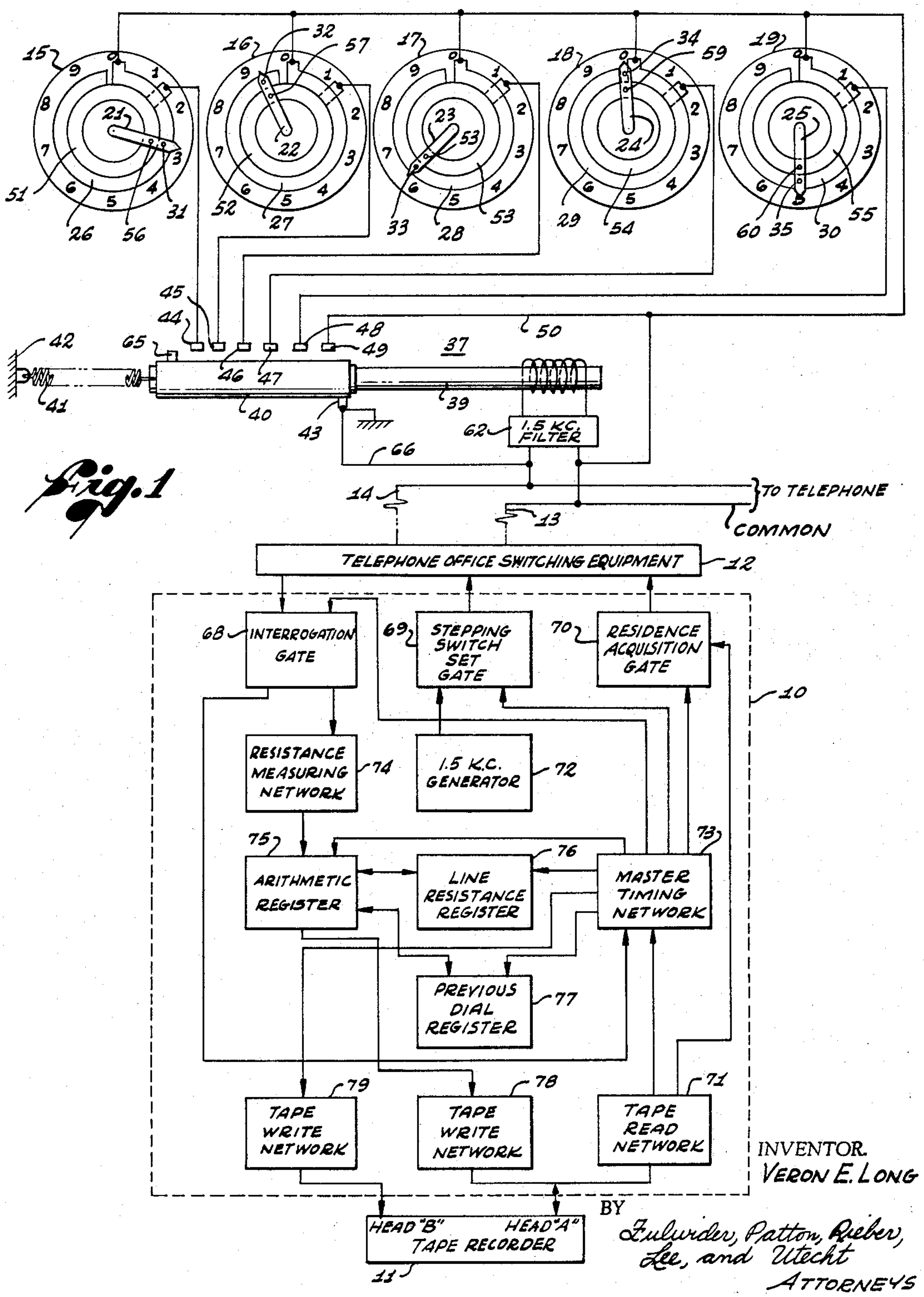
Figure 4:
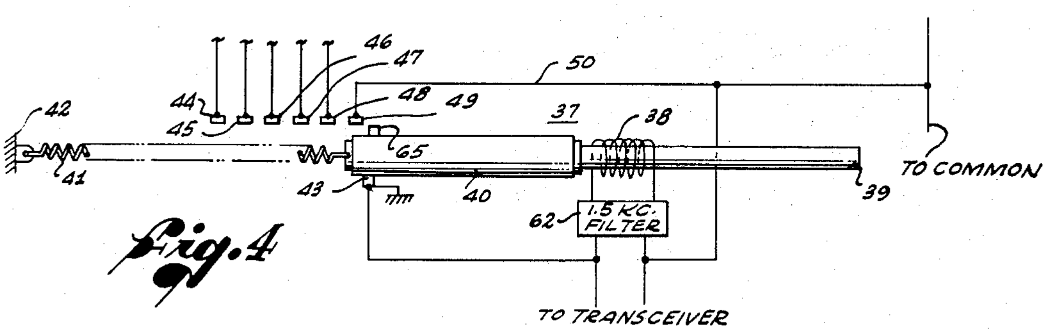
Figure 5:
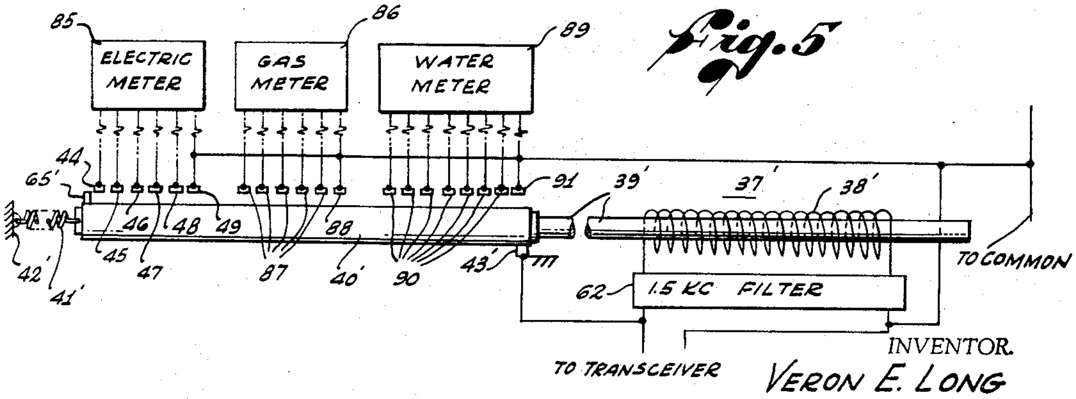

FIGURE 4 is a schematic diagram of the solenoid stepping switch of FIGURE 1, showing the plunger in the position to which it is set against a bias spring due to actuation of the solenoid from the remote control center, preparatory to making resistance measurements at each fixed contact as the plunger is moved back to its normally biased position; and FIGURE 5 is a schematic diagram of a solenoid stepping switch with fixed contacts connected for effecting measurements of the dial positions for electric, gas and water meters in one operation.

Referring to FIGURE 1, I provide a processing system 10 at a central telephone office which services telephones throughout a given district, for example, 100,000 telephones. A tape recorder 11 is provided which contains magnetic tape on which all of the telephone or line location numbers in the district are recorded. The processing system 10 is connected to the telephone office switching equipment 12. In response to each location number from the tape, the processing system 10 "dials" the number, and is thereby connected through the switching equipment 12 to that subscriber's telephone wire pair, indicated at 13, 14.

For purposes of illustration, let it be assumed that it is desired to read the dials of an electric meter. Such a meter, as is conventional, employs five dials 15–19, with respective pointers 21–25 adapted to be rotated over the faces thereof. The pointers 21–25 overlay resistance elements 26–30, and carry wipers 31–35 which ride on the resistance elements. Each of the resistance elements 26–30 is connected at one end, as through a line 36, to a point of reference potential, which is common with one of the lines 13 of the telephone wire pair. Thus, it will be seen that, as to each pointer, the resistance element varies as the pointer moves around the dial. Accordingly, at any instant, the resistance between a pointer and common corresponds to the position of the pointer, and hence the number on the dial face with which, or nearest to which, the pointer is aligned.

In the operation of the system of my invention the processing system 10 makes use of the known total resistance of the telephone lines 13, 14, which of course is the same for each of the dials 15–18. The processing system 10 makes individual measurements for each dial, and subtracts from each measurement the total resistance of the lines 13, 14. The results represent the corresponding pointer positions and the dial readings represented thereby. The processing system 10 records these readings in the tape recorder 11.

Switching to the various resistance elements 26–30 is accomplished through a suitable stepping switch mechanism, an example of which is shown in FIGURE 1 as a solenoid stepping switch 37. In the arrangement shown, the solenoid control coil 38 surrounds a magnetizable plunger rod 39 which at one end carries a conductive sleeve 40. The plunger is shown connected at one end to a tension spring 41, the opposite end of which is anchored to a stationary structure, indicated at 42. The spring 41 normally biases the plunger to the left, in which position the right-hand end of the conductor sleeve 40 engages a fixed contact 43.

Adjacent the conductor sleeve 40 is a set of six fixed contacts 44–49. One contact 49 is connected at 50 to the common line 13, and the remaining contacts 44–48 are connected through respective leads to conductors 51–55, which are formed as rings within the resistance elements 26–30. The pointers 21–26 carry additional contacts 56–60 which ride on the conductor rings 51–55. The two contacts carried by each pointer are electrically connected.

Operation of the solenoid stepping switch 37 is effected through the telephone lines 13, 14, as through a filter 62 connected to the lines, and to which the ends of the control coil 38 are connected. The processing system 10 sends a signal of desired frequency to the filter 62, such frequency preferably being within the range conventionally used by the telephone company for other test purposes, e.g., a frequency of 1.5 kc., which lies between the test frequencies of 1 kc. and 2 kc. frequently employed by telephone companies.

Referring to FIGURE 4 along with FIGURE 1, energization of the solenoid 37 results in the plunger 39 being moved to the right against the spring 41. In the extreme right-hand position of the plunger, the left end of the conductor sleeve 40 engages the fixed contact 43. The conductor sleeve 40 carries a contact 65 at its left end, and which is adapted to wipe against the fixed contacts 44–49. At both the extreme positions of the plunger, the contact 65 is not in engagement with any of the fixed contacts. Thus, in the deenergized condition of the solenoid (FIG. 1), the movable contact 65 is to the left of the fixed contact 44, and in the energized condition of the solenoid (FIG. 4), the movable contact 65 is to the right of the fixed contact 49.

It is the function of the processing system 10 to energize the solenoid 37 to move the movable contact 65 to the right-hand position shown in FIGURE 4, and then to release the solenoid, permitting the spring 41 to retract the plunger, and to make the measurements perviously described as the movable contact 65 successively engages the contacts 44–49 as the plunger is being retracted. In this connection, it will be seen that when the first contact 49 is engaged by the movable contact 65, there is a short circuit across the telephone wire pair. As noted, the fixed contact 43 is connected at 66 to the common line 13. Thus, the common ends of the resistors are connected through the fixed contact 49, the conductor sleeve 40, and the fixed contact 43 to the common line 13.

The processing system 10 includes three gates 68–70 connected to the telephone office switching equipment 12. Through the gate 70, denoted a residence acquisition gate, the processing system 10 calls the subscriber's location number, to be completed through the switching equipment 12 in the usual manner. For this purpose, the call signals for the subscriber's location number are applied to the gate 70 from a tape read network 71 which is connected to a "read-write" magnetic head, designated as head A, in the tape recorder 11.

After obtaining a through connection to the subcriber's lines, the processing system 10 operates through the gate 69, denoted a stepping switch set gate, to energize the solenoid 37. In this connection, a generator 72 is connected to the gate 69 for supplying the 1.5 kc. signal for energizing the solenoid. Such signal is passed through the switching equipment 12 and the subscriber's lines 13, 14 to energize the solenoid and set its plunger as previously described.

After the solenoid plunger is set, and then deenergized so it will retract, the gate 68, denoted an interrogation gate, functions to permit the processing system 10 to measure the resistance present at each of the fixed contacts 44–48 engaged by the movable contact 65.

Operation of the gates 68–70 in desired sequence is effected through a master timing network 73, which is coupled to each of the gates 68–70. The timing network 73 is connected to the output of the tape read network 71, and upon initiation of the signals of each subscriber's location number, the timing network opens the residence acquisition gate 70 to permit the number to be placed through the switching equipment 12. When the through connection to the lines 13, 14 is made, the timing network holds the gate 69 open to permit the signal from the generator 72 to be fed through the lines 13, 14 for energizing the solenoid and setting its plunger. Also, the timing network closes the residence acquisition gate 70 and opens the interrogation gate 68 so that the desired resistance measurements can be made.

In this latter connection, a resistance measuring network 74 is connected between the interrogation gate 68 and an arithmetic register 75. The arithmetic register 75 is connected to a line resistance register 76, a previous dial register 77, and a tape write network 78. The tape write network 78 is coupled to the read-write head A in the tape recorder 11, and functions to record signals on the tape which represent the resistance measurements made.

In operation of the system with existing telephone equipment, each subscriber's location number is recorded on the tape in digital form, wherein each digit is composed of an appropriate number of pulses, the number of pulses denoting the value of the digit. The tape recorder can be any of a number of readily available commercial units which provide flux reading heads and slow tape speed during the interrogation process. For example, the selected tape speed may be of the order of 0.1 in. per second during interrogation. As previously indicated, the tape will previously have had all desired location numbers for a given telephone district recorded thereon. Such recording may be accomplished at a high rate of speed, e.g., of the order of 10 feet (120 inches) per second.

Operation of the processing system 10 to make and record resistance measurements is predicated upon the subscriber's telephone being in the on-hook condition. If the telephone is engaged, i.e., in the off-hook condition, at any time during the interrogation process, the processing system 10 denotes that fact by recording a signal on the tape, and then proceeds to make the next call. To this end, a tape write network 79 is provided for recording such signals on the tape via a "write" head B in the tape recorder 11, the timing network 73 is connected to the tape write network 79, and the interrogation gate 68 is connected to the timing network 73.

As previously indicated, at the completion of residence acquisition, the residence acquisition gate 70 is turned off by the timing network 73, and the interrogation gate 68 is turned on. The gate 68 is kept on for a predetermined period, e.g., approximately 5.0 ms. If the subscriber's telephone is engaged during this period, i.e., is in the off-hook condition, an impedance is presented through the lines 13, 14 that is relatively low compared to that presented when the telephone is in the on-hook condition, e.g., off-hook impedance is less than 200 ohms, in contrast to on-hook impedance that is much greater, e.g., 100,000 ohms. The timing network 73 includes impedance-sensing means operable to generate a pulse, or bit, only upon being presented to a low impedance of the order of that encountered in the off-hook condition. Accordingly, if the telephone is in the off-hook condition, the timing network 73 feeds a bit into the tape write network 79 to be recorded on the tape, via the write head B, in a position corresponding to the location number of the engaged telephone. The master timing network responds to this same pulse to turn off the gates 68–70, and await the initiation of the next residence location number from the tape read network 71.

If the subscriber's telephone is not engaged, in which case a high impedance is presented through the gate 68, the master timing network 73 opens the stepping switch set gate 69 and closes the interrogation gate 68. This permits the 1.5 kc. signal from the generator 72 to pass through the gate 69 and the lines 13, 14 to the filter 62, thereby to energize the solenoid 37 and set its plunger to the position wherein the movable contact 65 is to the right of the fixed contact 49.

After a predetermined length of time, e.g., approximately 20 ms., the timing network 73 turns off the stepping switch set gate 69 and reopens the interrogation gate 68. At the first encounter of resistance, i.e., when the movable contact 65 engages the fixed contact 49, the timing network 73 starts a delay counter (not shown) which is included therein. The resistance measuring network 74 meanwhile measures the line resistance precisely, and converts the resultant analog voltage to a digital (binary) number consisting of four binary bits. After a predetermined delay, e.g., of the order of 5.0 ms., the timing network causes this digital number to be shifted into the arithmetic register 75, and thence to the line resistance register 76. Further action awaits movement of the retracting plunger of the deenergized solenoid stepping switch 37 to an open circuit, wherein the movable contact 65 is between fixed contacts 47 and 48, impedance, i.e., when the movable contact engages the fixed contact 48.

This second impedance represents the first utility meter reading, and the resistance reading is fed into the resistance measuring network 74, where it is converted to binary form. From the resistance measuring network 74, the number is shifted into the arithmetic register 75, wherein the number stored in the line resistance register 76 is subtracted therefrom.

A check is now made with the previous dial register 77 to resolve any ambiguity in the number. However, since this number represents the least significant dial of the first meter reading, no number has yet been placed in the previous dial register 77. Therefore, the number in the arithmetic register 75 represents the actual dial reading. Such number is then shifted by the master timing network 73 both into the previous dial register 77 and into the tape write network 78 to be recorded in binary form in the tape recorder 11.

The next open circuit and following impedance encountered by the movable contact 65 passing between fixed contacts 47, 48 and then into engagement with the fixed contact 47, sets the stage for reading the next dial 18. The entire process above described is repeated, except that readings are now available from the previous dial register 77 with which to settle ambiguities. In this connection, the arithmetic register compares the number in the previous dial register—which represents the lesser significant dial reading—and feeds a binary number to the tape write network 78 which accurately represents the position of the corresponding pointer.

A separate count is kept in the master timing network 73, and each time that the last dial of a meter is read, the previous dial register 77 is reset to zero preparatory to making measurements to obtain readings of the next meter. Also, a separate count is kept in the timing network to determine when the last contact point 44 is reached during retraction of the plunger of the solenoid. At this time, the final dial reading is written onto the tape, the previous dial register 77 is reset, and the timing network 73 returns to the residence acquisition mode to await the next residence location number from the tape read network 71.

With my system, all three meters at a residence—electric, gas and water—can be read during one interrogation. Referring to FIGURE 5, an electric meter 85 is shown with leads from the dial resistors connected to the fixed contacts 44–49 as previously described. A gas meter 86, which has five dials like the electric meter 85, is similarly provided with dial resistance elements connected to five fixed contacts 87, and a sixth contact 88 connected to common. A water meter 89 is provided with seven dials, each equipped with pointers and resistance elements as previously described for the electric meter, and is provided with seven fixed contacts 90, and an eighth contact 91 which is connected to common. The solenoid 37' is the same as the solenoid 37 previously described, except that its plunger is of sufficient length so that the contact 65' movable therewith can travel between extreme positions wherein, at its left position, the contact 65' is to the left of the fixed contact 44 of the electric meter 85, and in its right-hand position, the contact 65' is to the right of the fixed contact 91.

Thus, after the solenoid 37' is energized to set the movable contact 65' to the right of the fixed contact 91 of the water meter 89, and is then deenergized to permit the spring 41' to retract the plunger 39', the system above described automatically makes measurements, in sequence, of the dial positions of the water meter 89, the gas meter 86, and the electric meter 85. In the arrangement shown, upon completion of the last dial reading of each of the meters 86 and 89, the next contact engaged by the movable contact 65' is a contact—contact 88 following the last dial reading for the water meter 89, and contact 49 following the last dial reading for the gas meter 86—and at each of these positions, the processing system measures the resistance of the telephone lines as the initial step preparatory to making resistance measurements and recording the dial readings of the corresponding meter.

By thus recording the readings of all three meters at each subscriber's residence on a single tape, my invention facilitates the billing of customers of all three utility companies from a single billing center. As will be apparent, billings consolidated in this manner eliminate duplication of billing procedures by separate utilities, and reduce mailing costs to that of a single company, all at considerable savings in time, money and effort.

Figure 2:
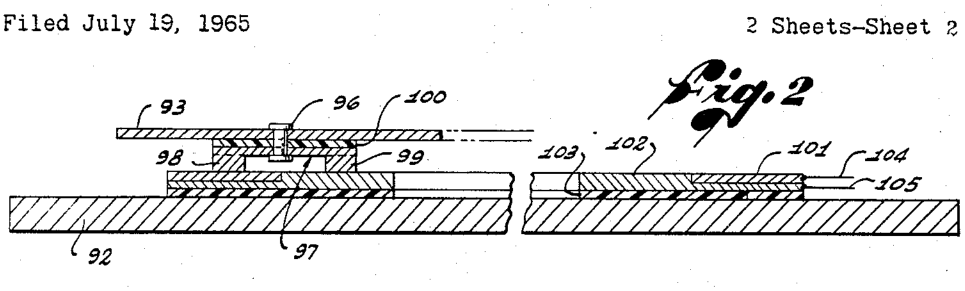
FIGURE 2 is an enlarged fragmentary sectional view of the dial, showing the resistance element formed as a ring surrounding a conductor ring, the resistance element and conductor ring being supported on an adhesive backing which adheres to the face of the dial, and showing the pointer carrying wipers which are conductively connected but electrically isolated from the pointer.
Figure 3:
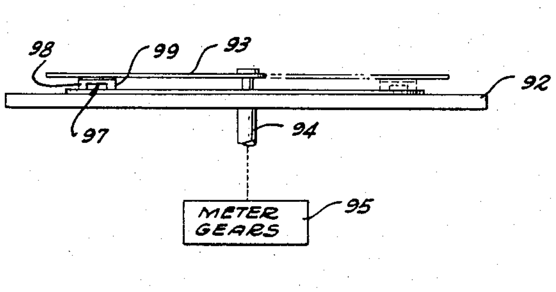
FIGURE 3 is a side elevation view of the dial and pointer, drawn somewhat more to scale, and illustrating the operation of the meter gears for operating the shaft on which the pointer is mounted.

Furthermore, my system is one which does not require special meter construction, but makes use of existing meters at subscribers' residences. Referring to FIGURE 3, there is shown a conventional meter dial 92, pointer 93, and shaft 94 on which the pointer 93 is mounted and which is operated through the meter gears 95. Referring to FIGURE 2 along with FIGURE 3, there is attached at 96, near the outer end of the pointer 93, a U-shaped conductive element 97, the legs of which constitute wipers 98, 99. The element 97 is insulated, as by a strip 100 of insulation material, from the pointer 93.

The wipers 98, 99 ride on respective resistance and conductor rings 101, 102. The resistance ring 101, as shown, is a flat element positioned in a radial recess in the outer portion of the conductor ring 102. Affixed to the conductor ring 102 is a ring 103 of adhesive material, which is attached to the front face of the dial 92. A lead 104 is connected to the resistance ring 101, and a lead 105 is connected to the conductor ring 102.

Preferably, the resistance element 101 and conductor ring 102 are formed as films deposited on the adhesive backing ring 103, so that they can readily fit in the space between the pointer 93 and the dial 92 of existing meter constructions. In this manner, existing meters are adapted for use in my invention without altering their structures, and only a minimum of wiring is required to connect them in circuit in a system of my invention. The stepping switch mechanisms, and my invention obviously embraces the use, not only of linear type stepping switches such as the solenoid stepping switches shown and described herein, but also rotary type stepping switches, may conveniently be packaged in a small housing, with the requisite number of terminals from the fixed contact therein made accessible for connection to the wires from the resistance elements and conductor elements are previously described in connection with FIGURE 1. Such units may be mounted in the meter box in a convenient location, or in any other desired location, and the terminals to the filter connected to the telephone wire pair.

It will be apparent from the foregoing that various modifications can be made in the embodiments illustrated and described herein without departing from the spirit and scope of my invention. Accordingly, I do not intend that my invention be limited, except as by the appended claims.

I claim:

1. A system for automatically determining the position of a rotatable element comprising:
- a resistance element connected at one end to a point of reference potential;
- a wiper member carried by the rotatable element for traversing said resistance element;
- a pair of transmission lines for connection, respectively, to said one end of said resistance element and to said wiper member;
- remote processing means including means for sequentially measuring the resistance of said transmission lines and the combined resistances of said transmission lines and the portion of said resistance element between said one end thereof and said wiper member;
- and means for subtracting the resistance of said transmission lines from said combined resistances.

2. A system as set forth in claim 1, and further including:
- means for recording the difference between said combined resistances and said resistance of said transmission lines.

3. A system as set forth in claim 1, and further including:
- a plurality of pairs of transmission lines and associated resistance elements and wiper members; and
- means for sequentially connecting each pair of said transmission lines to said remote processing means.

4. A system for determining the positions of different rotatable elements comprising:
- a resistance element for each rotatable element, each connected at one end to a point of reference potential;
- a respective wiper member carried by each rotatable element;
- a pair of transmission lines, one being connected to said point of reference potential;
- means for sequentially connecting said wiper members to the other transmission line;
- means operable when each wiper member is connected to said other transmission line for measuring the combined impedances of said transmission lines and the portion of the corresponding resistance element between its wiper member and the point of reference potential;
- and means for subtracting the impedance of said transmission lines from said combined impedances.

5. A system as set forth in claim 4, wherein said means for sequentially connecting said wiper members includes:
- a stepping switch and signal responsive means for operating said stepping switch.

6. A system as set forth in claim 4, and further including:
- means for recording the difference between said combined impedances and the impedance of said transmission lines.

7. An automatic meter reading system operable through telephone switching equipment and existing telephone lines for reading a meter having a plurality of dials with rotatable pointers comprising:
- a resistance element attached to each dial, such element being formed as a split ring, one end of each resistance element being connected in common with one of the telephone lines;
- a wiper for each resistance element carried by the pointer of the associated dial;
- a stepping switch mechanism for sequentially connecting said wipers to the other telephone line;
- signal responsive means for operating said stepping switch mechanism;

- means at a remote center operable through the telephone switching equipment and telephone lines for operating said stepping switch mechanism;
- means at the remote center and operable when each wiper is connected to said other telephone line to measure the combined impedances of the telephone lines and the portion of the resistance element between its wiper and said one end thereof;
- and means coupled to said measuring means and operable in response to each measurement to subtract the impedance of the telephone lines from the associated combined impedances.

8. A system as in claim 7, including a tape recorder at the remote location containing recordings of location numbers of subscribers' telephones;
- means responsive to each location number to establish a connection through the switching equipment to the associated telephone lines to permit measurements to be made by said impedance measuring means;
- and means coupled to said subtracting means for recording in the tape recorder numbers corresponding to the resistance values obtained from subtraction.

9. An automatic meter reading system as set forth in claim 7, and further including:
- means associated with said means for operating said stepping switch mechanism for preventing operation of said signal responsive means when a telephone associated with said telephone lines is in the off-hook condition.

10. An automatic meter reading system as set forth in claim 7, wherein said stepping switch mechanism includes:
- a movable contact and a row of fixed contacts which number one more than the number of wipers, each wiper being conductively connected to a respective fixed contact, the remaining one fixed contact being connected to common, said stepping switch being operable during measurements to cause said movable contact first to engage said one fixed contact, and then sequentially engage the other fixed contacts, said measuring system developing a signal representing the impedance of the telephone wire pair when said movable contact is in engagement with said one fixed contact.

11. In a telephone system having switching equipment through which subscribers' telephone location numbers can be dialed for providing through connections to their respective telephone wire pairs, one of the telephone lines of each wire pair being a common, automatic meter reading apparatus for meters having a plurality of dials and rotatable pointers comprising:
- a resistance element attached to each dial, such element being formed as a split ring, one end of each resistance element being connected in common with one of the telephone lines;
- a wiper for each resistance element carried by the pointer of the associated dial;
- a stepping switch mechanism at each meter location for sequentially connecting said wipers to the common telephone line;
- a remote processing system including recording means containing a recording of each subscriber's location number;
- means coupled to said recording means and responsive to each recorded location number to establish a connection through the switching equipment to the associated telephone wire pair;
- means operable upon the connection being established for transmitting a signal through the telephone wire pair to the meter location;
- means at the meter location responsive to said signal for operating said stepping switch mechanism;
- measuring means in said processing system and operable upon connection of each wiper to the common telephone line to measure the impedance of the portion of the associated resistance element between the common telephone line and the wiper;

and recording means coupled to said measuring means and operable to record the measurements in said recording means at positions corresponding to the location number for the associated meter.

12. A system as in claim 11, further including means in said processing system for preventing operation of said measuring system when a subscriber's telephone is in the off-hook condition.

13. A system as in claim 12, wherein said stepping switch mechanism includes a movable contact and a row of fixed contacts which number one more than the number of wipers, each wiper being conductively connected to a respective fixed contact, the remaining one fixed contact being connected to common, said stepping switch being operable during measurements to cause said movable contact first to engage said one fixed contact, and then sequentially engage the other fixed contacts, said measuring system developing a signal representing the impedance of the telephone wire pair when said movable contact is in engagement with said one fixed contact.

14. A system as in claim 13, wherein said recording means is a tape recorder, and wherein said processing system includes:

a residence acquisition gate, a stepping switch set gate, and an interrogation gate coupled to the telephone switching equipment, said measuring means being coupled to said interrogation gate;

signal generator means for operating said stepping switch mechanism being coupled to said stepping switch set gate;

a tape read network coupled to said residence acquisition gate;

a tape write network coupled to said measuring means, said tape write network being operable to record the measurements in said tape recorder at positions corresponding to the location number for the associated meter;

and a timing network coupled to said tape read network and each of said gates, said timing network and said tape read network opening said residence acquisition gate, in response to signals from the tape read network corresponding to a location number in the tape recorder, to establish a connection to the corresponding telephone wire pair through the switching equipment, said timing network opening said stepping switch set gate for a predetermined period after said connection is made for setting said stepping switch mechanism in position to permit its movable contact to engage said one fixed contact first for measuring purposes, and said timing network opening said interrogation gate to permit measurements by said measuring means.

15. A system as in claim 14, wherein said processing system further includes a second tape write network coupled to said timing network;

a connection between said interrogation gate and said timing network, said timing network causing said interrogation gate to open after a connection is made and before said stepping switch set gate is open, said timing network including means to generate a bit when the telephone is in the off-hook condition, said second tape write network causing said bit to be recorded in said tape recorder, said timing network coincidentally with generation of said bit also turning off all said gates preparatory to initiation of the signals of the next location number from said first-mentioned tape write network.

16. A system as in claim 15, wherein said measuring means includes a resistance measuring network coupled to said interrogation gate, an arithmetic register coupled to said measuring network;

a line resistance register and a previous dial register each coupled to said arithmetic register;

and connections from said timing network to each of said registers.

17. A system for automatically determining the impedance of a variable impedance element from a remote location comprising:

a pair of transmission lines for connection across said variable impedance element;

remote processing means including means for sequentially measuring the impedance of said transmission lines and the combined impedances of said transmission lines and said variable impedance element;

and means for subtracting the impedance of said transmission lines from said combined impedances.

18. The system of claim 17 wherein said variable impedance element includes:

a resistance element connected at one end to one of said pair of transmission lines; and a wiper contact member for traversing said resistance element, said contact member being connected to the other of said pair of transmission lines.

References Cited

UNITED STATES PATENTS

| | | | |
|---|---|---|---|
| 2,280,775 | 4/1942 | Mirk | 340—150 |
| 2,321,922 | 6/1943 | Leathers | 340—150 X |
| 3,266,018 | 8/1966 | Higgins | 340—151 |

ROBERT L. GRIFFIN, *Primary Examiner.*

J. T. STRATMAN, *Assistant Examiner.*